United States Patent
Zhang et al.

(10) Patent No.: US 7,406,587 B1
(45) Date of Patent: Jul. 29, 2008

(54) METHOD AND SYSTEM FOR RENAMING REGISTERS IN A MICROPROCESSOR

(75) Inventors: David X. Zhang, San Jose, CA (US); Kenneth C. Yeager, Sunnyvale, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 462 days.

(21) Appl. No.: 10/210,257

(22) Filed: Jul. 31, 2002

(51) Int. Cl.
G06F 9/30 (2006.01)

(52) U.S. Cl. ...................................... 712/217

(58) Field of Classification Search ................ 712/216, 712/234, 217, 218, 235
See application file for complete search history.

(56) References Cited

U.S. PATENT DOCUMENTS

| | | | | |
|---|---|---|---|---|
| 5,727,176 | A * | 3/1998 | Clift et al. ................... | 712/217 |
| 5,758,112 | A | 5/1998 | Yeager et al. | |
| 5,826,070 | A * | 10/1998 | Olson et al. ................. | 712/222 |
| 5,867,683 | A * | 2/1999 | Witt et al. .................... | 712/218 |
| 5,974,240 | A * | 10/1999 | Chan ........................... | 712/218 |
| 6,061,785 | A * | 5/2000 | Chiarot et al. .............. | 712/236 |
| 6,119,223 | A * | 9/2000 | Witt ............................ | 712/244 |
| 6,266,763 | B1 * | 7/2001 | Witt et al. .................... | 712/63 |
| 6,425,072 | B1 * | 7/2002 | Meier et al. ................. | 712/218 |
| 6,505,293 | B1 * | 1/2003 | Jourdan et al. .............. | 712/217 |
| 6,775,761 | B2 * | 8/2004 | Wang et al. .................. | 712/218 |
| 2002/0112148 | A1 * | 8/2002 | Wang et al. .................. | 712/226 |
| 2003/0149865 | A1 * | 8/2003 | Kadambi ..................... | 712/244 |
| 2003/0182538 | A1 * | 9/2003 | Gold et al. ................... | 712/217 |

OTHER PUBLICATIONS

Yeager, Kenneth C. "The Mips R10000 Superscalar Microprocessor." IEEE, 1996. pp. 28-40.*
MIPS IV Instruction Set. Rev. 3.2. MIPS Technologies, Inc. 1995. pp. B-38 to B-42, B-46.*
Dezso Sima, Terence Fountain, and Peter Kacsuk. "Advanced Computer Architecture: A design space approach." Addison Wesley, 1997. pp. 254-255, 260 and 286-290.*
Sima, Fountain, and Kacsuk. Advanced Computer Architectures, A Design Space Approach: Addison-Wesley, 1997. pp. 258-266, 272-273 and 277-278.*
David A. Patterson, "Another Dynamic Scheduling Approach—The Tomasulo Approach" Computer Architecture A Quantitative Approach, Second Edition, pp. front page, 251-255 and 362.

* cited by examiner

Primary Examiner—Eddie P Chan
Assistant Examiner—Jacob Petranek
(74) Attorney, Agent, or Firm—Baker Botts L.L.P.

(57) ABSTRACT

A processor includes an active list to buffer instructions and their associated condition codes for processing. A mapping table in the processor maps a logical register associated with the instruction to a selected one of a plurality of unique physical registers. The selected unique physical register is used to hold a result according to execution of the instruction. An indication is provided to the mapping table when the selected unique physical register contains the result. The result is then moved to a fixed status register. The selected unique physical register is then returned for later reuse and the next consecutive physical register is selected for the next instruction such that physical registers are used in order. An indication is provided for output to inform whether the result is in the selected unique physical register or has been moved to the fixed status register.

20 Claims, 18 Drawing Sheets

METHOD AND SYSTEM FOR RENAMING REGISTERS IN A MICROPROCESSOR

TECHNICAL FIELD OF THE INVENTION

The present invention relates in general to a microprocessor design and operation and more particularly to a method and system for renaming registers in a microprocessor.

BACKGROUND OF THE INVENTION

Register renaming is a critical component and has long been a challenge in microprocessor design. There are two kinds of condition code instructions that require implementation of register renaming, instructions that set condition code bits and instructions that test the condition code bits. For an out of order execution pipeline device, the challenge is to keep track of the dependency between the two kinds of condition code instructions. In conventional microprocessors, a (CAM) structure is used to check such dependencies. However, when the size of the active condition code instruction list increases, the CAM structure becomes proportionately bigger and timing becomes constrained.

SUMMARY OF THE INVENTION

From the foregoing, it may be appreciated by those skilled in the art that a need has arisen for a technique to efficiently improve condition code instruction processing in a microprocessor. In accordance with the present invention, a method and system for renaming registers in a microprocessor are provided that substantially eliminate or greatly reduce disadvantages and problems associated with conventional condition code instruction tracking techniques.

According to an embodiment of the present invention there is provided a method for renaming registers in a microprocessor that includes receiving an instruction for execution, decoding the instruction, and placing the instruction in an active list. A logical register associated with the instruction is mapped to a selected unique physical register. The instruction is executed to obtain a result and the result is placed in the unique physical register. An indication is provided that the result is in the unique physical register. The result is moved to a fixed status register. An identity of the selected unique physical register is returned for future selection upon graduation of the instruction.

The present invention provides various technical advantages over conventional condition code instruction tracking techniques. For example, one technical advantage is to improve processor timing in handling condition code instructions. Another technical advantage is to reduce design size and silicon area as compared to conventional CAM structures. Yet another technical advantage is to extend the size of the active list without any degradation in performance. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1A:
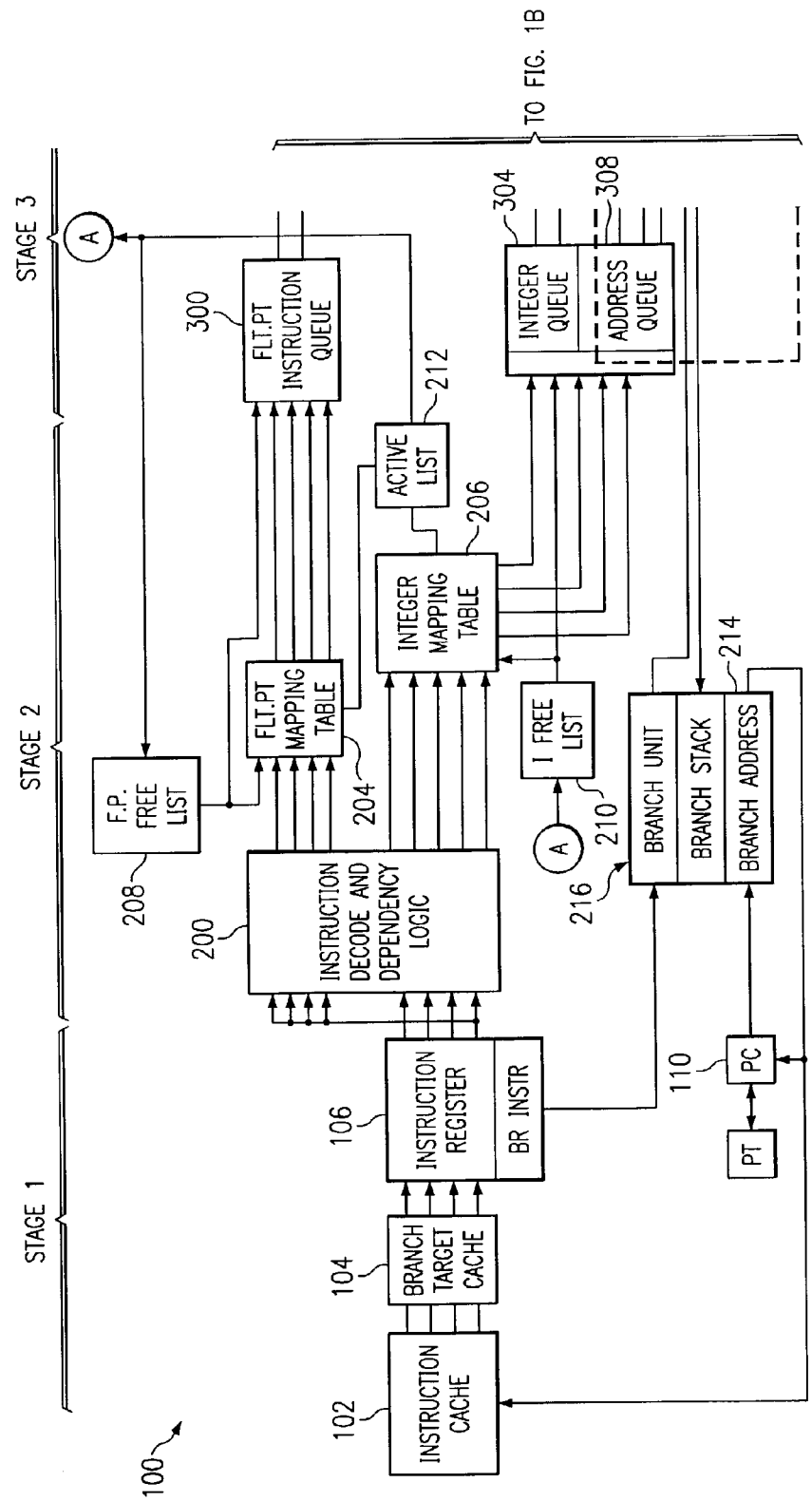
FIG. 1 illustrates a simplified block diagram of a processor.
Figure 1B:
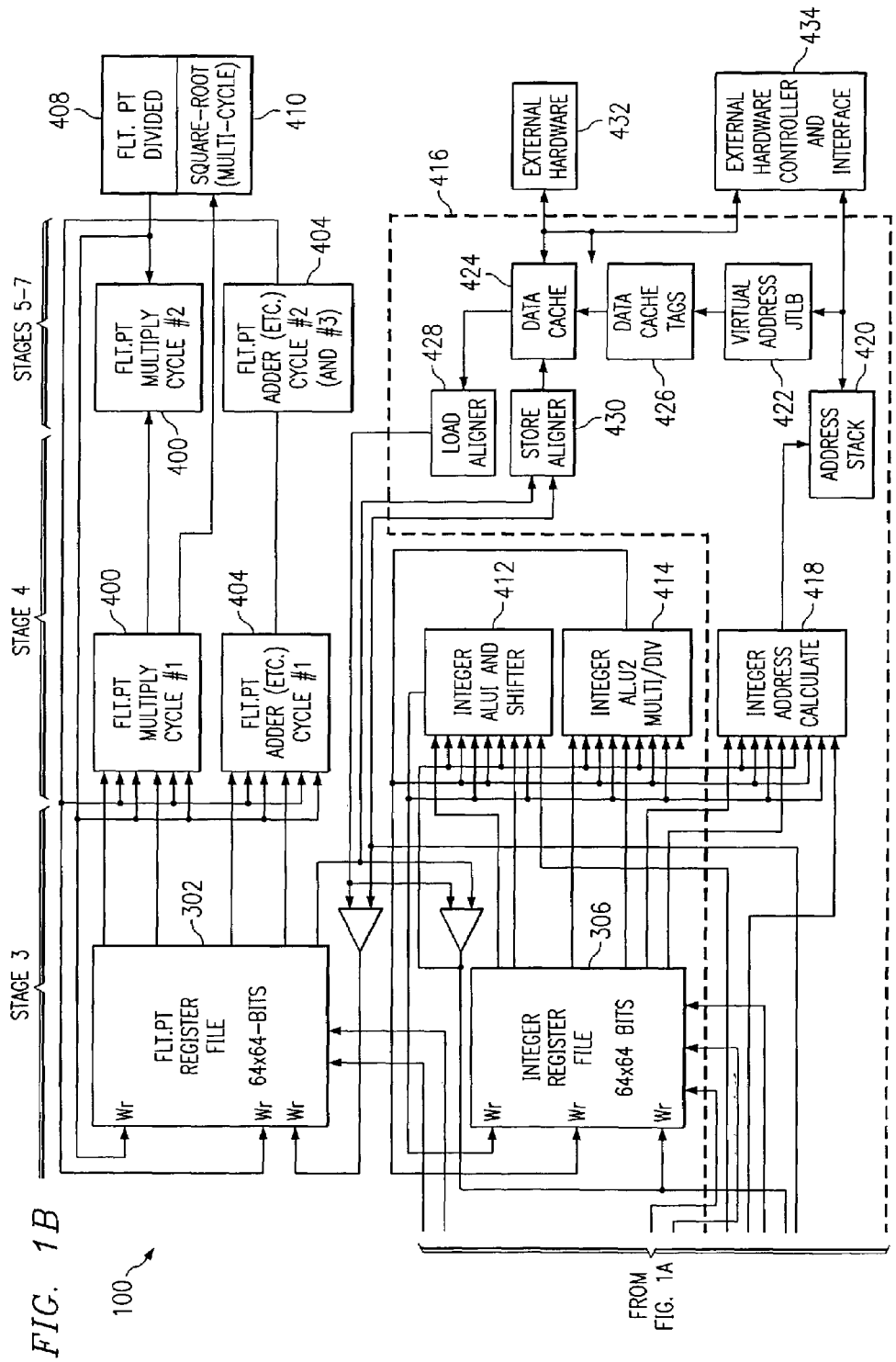

FIG. 1 discloses a functional block diagram of a superscalar processor 100. Processor 100, which generally represents the R10000 Super-Scalar Processor developed by Silicon Graphics, Inc., of Mountain View, Calif., provides only one example of an application for the present invention. This processor is described in J. Heinrich, MIPS R10000 Microprocessor User's Manual, MIPS Technologies, Inc., (1994). A superscalar processor can fetch and execute more than one instruction in parallel. Processor 100 may fetch and decode four instructions per cycle. Each decoded instruction is appended to one of three instruction queues. These queues can issue one new instruction per cycle to each of five execution pipelines. The block diagram of FIG. 1 is arranged to show the stages of an instruction pipeline and illustrates functional interconnectivity between various processor elements. Generally, instruction fetch and decode are carried out in stages 1 and 2, instructions are issued from various queues in stage 3, and instruction execution is performed in stages 4-7.

In operation, a primary instruction cache 102 reads four consecutive instructions per cycle, beginning on any word boundary within a cache block. A branch target cache 104, instruction register 106, and instruction decode and dependency logic 200 convey portions of issued instructions to floating point mapping table 204 (32 word by 6 bit RAM) or integer mapping table 206 (33 word by 6 bit RAM). These tables carry out a "register renaming" operation, described in detail below, which renames logical registers identified in an instruction with a physical register location for holding values during instruction execution. Mapping tables 204 and 206 also receive input from a floating point free list 208 (32 word by 6 bit RAM) and an integer free list 210 (32 word by 6 bit RAM), respectively. Output of both mapping tables is fed to active list 212 which, in turn, feeds the inputs of free lists 208 and 210.

A branch unit 214 also receives information from instruction register 106. This unit processes no more than one branch per cycle. The branch unit includes a branch stack 216 which contains one entry for each conditional branch. Processor 100 can execute a conditional branch speculatively by predicting the most likely path and decoding instructions along that path. The prediction is verified when the condition becomes known. If the correct path was taken, processing continues along that path. Otherwise, the decision must be reversed, all speculatively decoded instructions must be aborted, and the program counter and mapping hardware must be restored.

Mapping tables 204 and 206 support three general pipelines which incorporate five execution units. A floating-point pipeline is coupled to floating-point mapping table 204. The floating-point pipeline includes a sixteen-entry instruction queue 300 which communicates with a sixty-four-location floating point register file 302. Register file 302 and instruction queue 300 feed parallel multiply unit 400 and adder 404 (which performs, among other things, comparison operations to confirm floating-point branch predictions). Multiply unit 400 also provides input to a divide unit 408 and square root unit 410.

Second, an integer pipeline is coupled to integer mapping table 206. The integer pipeline includes a sixteen-entry integer instruction queue 304 which communicates with a sixty-four-location integer register file 306. Register file 306 and instruction queue 304 feed two arithmetic logic units (ALU) ALU#1 412 (which contains an ALU, shifter, and integer branch comparator) and ALU#2 414 (which contains an ALU, integer multiplier, and divider).

Third, a load/store pipeline (or load/store unit) 416 is coupled to integer mapping table 206. This pipeline includes a sixteen-entry address queue 308 which communicates with register file 306. Register file 306 and address queue 308 feed integer address calculate unit 418 which, in turn, provides virtual-address entries for address stack 420. These virtual addresses are converted to physical addresses in joint translation lookaside buffer (JTLB) 422 and used to access a data cache 424 and data cache tags 426. Data input to and output from data cache 424 pass through store aligner 430 and load aligner 428, respectively. Address stack 420 and data cache 424 also communicate with external hardware controller and interface 434. Further, data cache 424 and controller/interface 434 communicate with external hardware 432.

Processor 100 uses multiple execution pipelines to overlap instruction execution in five functional units. As described above, these units include the two integer ALUs 412 and 414, load/store unit 416, floating-point adder 404, and floating-point multiplier 400. Each associated pipeline includes stages for issuing instructions, reading register operands, executing instructions, and storing results. There are also three "iterative" units (ALU#2 414, floating-point divide unit 408, and floating-point square root unit 410) which compute more complex results.

Register files 302 and 306 must have multiple read and write ports to keep the functional units of processor 100 busy. Integer register file 306 has seven read and three write ports and floating-point register file 302 has five read and three write ports. The integer and floating-point pipelines each use two dedicated operand ports and one dedicated result port in the appropriate register file. Load/Store unit 416 uses two dedicated integer operand ports for address calculation. It also loads or stores either integer or floating-point values while sharing a result port and a read port in both register files. These shared ports are also used to move data between the integer and floating-point register files.

In a pipeline, the execution of each instruction is divided into a sequence of simpler operations. Each operation is performed by a separate hardware section called a stage. Each stage passes its result to the next stage. Usually, each instruction requires only a single cycle in each stage and each stage can begin a new instruction while previous instructions are being completed by later stages. Thus, a new instruction can often begin during every cycle.

Pipelines greatly improve the rate at which instructions can be executed. However, the efficient use of a pipeline requires that several instructions be executed in parallel. The result of each instruction is not available for several cycles after that instruction entered the pipeline. Thus, new instructions must not depend on the results of instructions which are still in the pipeline.

Processor 100 fetches and decodes instructions in their original program order but may execute and complete these instructions out of order. Once completed, instructions are "graduated" in their original program order. Instruction fetching is carried out by reading instructions from instruction cache 102. Instruction decode operation includes dependency checks and register renaming performed by instruction decode and dependency logic 200 and mapping tables 204 or 206, respectively. The execution units identified above compute an arithmetic result from the operands of an instruction. Execution is complete when a result has been computed and stored in a temporary register identified by register file 302 or 306. Finally, graduation commits this temporary result as a new permanent value.

An instruction can graduate only after it and all previous instructions have been successfully completed. Until an instruction has graduated, it can be aborted and all previous register and memory values can be restored to a precise state following any exception. This state is restored by "unnaming" the temporary physical registers assigned to subsequent instructions. Registers are unnamed by writing an old destination register into the associated mapping table and returning a new destination register to the free list. Renaming is done in reverse program order in the event a logical register was used more than once. After renaming, register files 302 and 306 contain only the permanent values which were created by instructions prior to the exception. Once an instruction has graduated, however, all previous values are lost.

Active list 212 is a list of "active" instructions in program order. It records status, such as which instructions have been completed or have detected exceptions. Instructions are appended to its bottom when they are decoded. Completed instructions are removed from its top when they graduate.

Processor 100 uses "register renaming" to manage dependencies between registers. Renaming is implemented with mapping tables 204 and 206, free lists 208 and 210, floating-point register file 302, integer register file 306, and active list 212. The free lists contain the names of all physical registers (locations in register files 302 and 306) that are currently not in use. Active list 212 contains an entry for each instruction being processed in a pipeline. Instructions are appended to the active list as they are decoded and are removed as they graduate. As noted above, active list 212 lists all pending instructions in order.

Register renaming is a technique used to keep track of changing register values. Processor 100 generates a myriad of temporary register results as it executes instructions. These temporary values, along with permanent values, are stored in register files 302 or 306. Temporary values become new permanent values when the corresponding instructions graduate. Renaming identifies where the current (temporary or permanent) value of each register is in the register file.

Renaming distinguishes between logical registers, which are referenced within instruction fields, and physical registers, which are locations in the hardware register files. The programmer is aware of only the logical registers. The implementation of physical registers is entirely hidden. Only physical registers are actually implemented in hardware. Logical register numbers are dynamically mapped into physical register numbers. This mapping is implemented using mapping tables 204 and 206 which are updated after each instruction is decoded. Each new result is written into a new physical register. Its value is temporary as the previous contents of each logical register can be restored in case its instruction must be aborted following an exception or a mispredicted branch. In the event of an exception, active list 212 is used to restore logical register contents. Alternatively, in the event of a mispredicted branch, shadow mapping tables as described below are used to restore the pre-branch state of logical registers.

Renaming simplifies dependency checks. Logical register numbers can be ambiguous when instructions are executed out of order because the same logical register may be repeatedly loaded with different values if it is specified by several instructions that are simultaneously in the pipeline. Because physical register numbers uniquely identify each result, dependency checking is unambiguous. The queues and execution units use physical register numbers. In accordance with an embodiment of the present invention, integer and floating point registers are implemented with separate renaming maps 204 and 206 and multi-port register files 302 and 306.

Instructions are executed "dynamically" after resolving all dependencies on previous instructions. Each instruction can begin operation as soon as all its operands are available. As such, an instruction need not wait until every previous instruction has been executed. A busy-bit table keeps track of which physical registers are busy (not available). Each register is initially busy when it is assigned from the associated free list and it becomes not busy when a result is stored.

If the physical register number of an operand is not available when the instruction is decoded, that instruction must wait in a queue. The register number of the operand is compared to the destination register number of each instruction that is completed. When it matches, the operand becomes available. Because physical register numbers are uniquely assigned to each instruction, this match can occur only for the instruction which generated the required result. With a few exceptions, integer queue 304 and address queue 308 have integer operand registers and floating-point queue 300 has floating-point operand registers.

Figure 2:
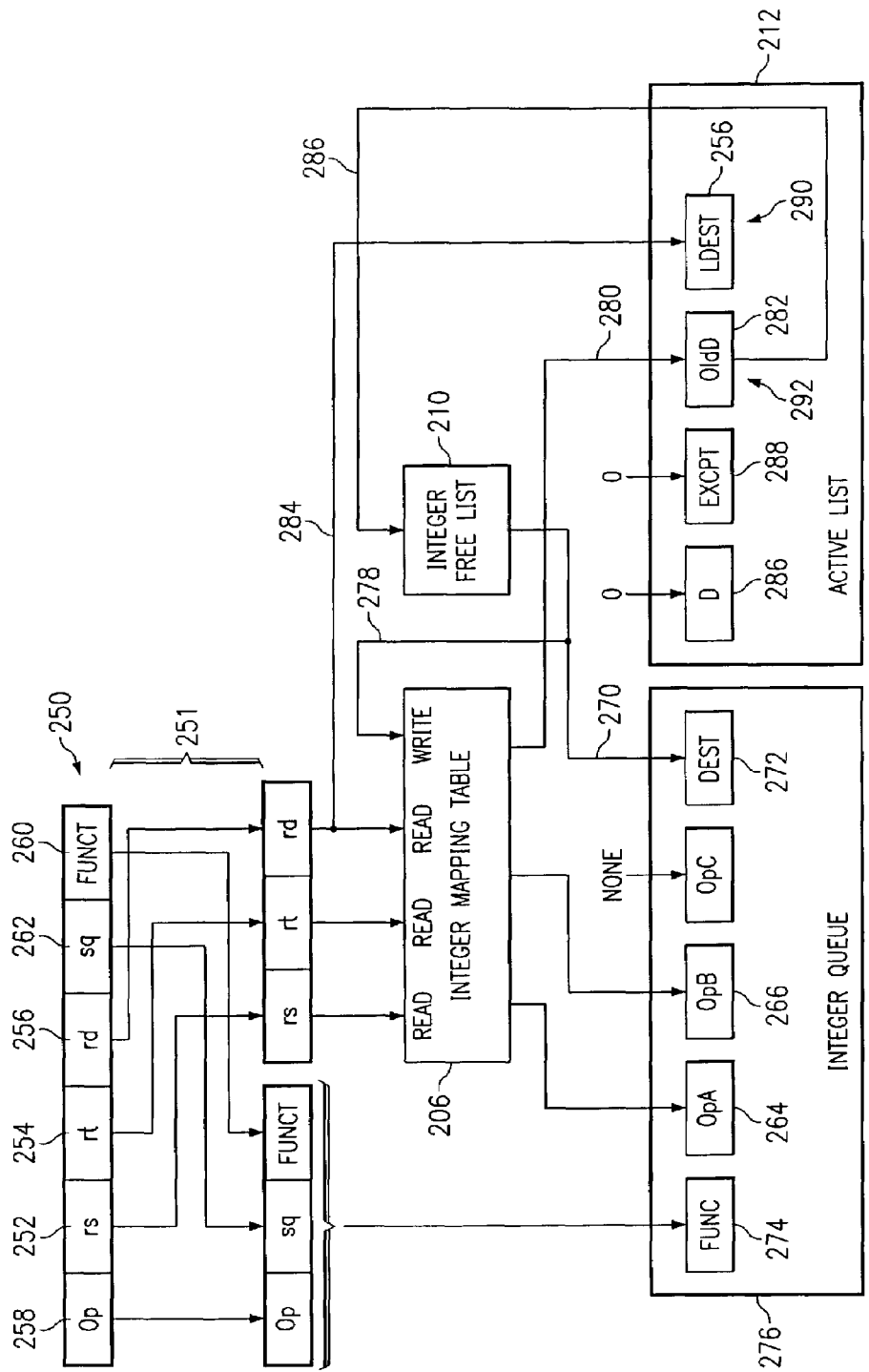
FIG. 2 illustrates a simplified mapping of an instruction received by the processor.

FIG. 2 illustrates the mapping of a simple integer ALU instruction such as an ADD instruction. ADD instruction 250 is configured in a preliminary format while being held in a main memory. The instruction fields are rearranged prior to being stored in instruction cache 102 through a "predecode" operation 251. Logical registers in processor 100 are usually selected using five-bit numbers 252 (rs), 254 (rt) and 256 (rd). The hardware stores copies of these registers in "physical registers" held in register files 302 and/or 306. Each physical register is identified by a six-bit physical number in the appropriate register file. The existence of these physical registers and the mapping of logical registers to physical registers are invisible to the programmer. In addition to logical register numbers, instruction 250 contains function-related fields 258 (opcode), 260 (function), and 262 (subfunction).

Logical operand register numbers 252 and 254 are mapped directly to physical register numbers held in mapping table 206, resulting in physical operand register numbers 264 (OpA) and 266 (OpB). (Physical operand register number 268 (OpC) is used only in floating-point operations.) Conversely, logical destination register number 256 is mapped to a physical destination register number held in integer free list 210, as shown by line 270, resulting in a physical register number 272 (Dest). In addition, function-related fields 258, 260, and 262 undergo a further predecode operation that groups these fields into a single function field 274. This function field and the foregoing physical numbers are gathered in a single mapped instruction 276 which is placed in integer queue 304 to await its turn for execution.

In addition to mapping logical destination register number 256, free list 210 forwards physical register number 272 to mapping table 206, as shown by line 278, thereby updating the table. As such, mapping table 206 reflects the latest mapping of logical destination register number 256. The old physical destination 282 associated with logical number 256 is output from mapping table 206 and appended to active list 212, as shown by line 280. Logical address 256 is also appended to active list 212, as shown by line 284. These two values, along with done bit 286 and exception field 288, form the latest entry in active list 212 which functions as a first-in-first-out ("FIFO") list. Old physical destination 282 will ultimately be returned to free list 210, as indicated by line 286, when instruction 276 graduates.

Clearly, there are more physical than logical registers since physical registers also store tentative results for instructions which have completed but have not yet graduated. A logical register may have a sequence of values as instructions flow through the pipeline. Whenever an instruction modifies a register, a new physical register is assigned to the logical destination register. These assignments are stored in register mapping tables 204 and 206. As each instruction is decoded, each of its logical register fields is replaced with the corresponding physical register number.

Each physical register is written exactly once. After it is output from a free list and until it is written with a result from a corresponding instruction, the physical register is "busy". If a subsequent instruction needs the values of this physical register, such instruction must wait until the register is written. After being written, the register is "ready", and its value is never changed. When a subsequent instruction changes the corresponding logical register, the result will be written into a new physical register. When this subsequent instruction graduates, the old value is no longer needed and the old physical register becomes "free" for re-use. Thus, physical registers have unambiguous values.

Integer and floating-point registers are stored in separate register files and are renamed independently. Processor 100 contains 33 logical and 64 physical integer registers. The extra logical register is the result of predefined register numbers associated with certain arithmetic operations. Processor 100 also contains 32 logical and 64 physical floating-point registers.

As stated above, processor 100 includes two register mapping tables, integer mapping table 206 and floating-point mapping table 204. In this processor, each table maps a five-bit logical register number into a corresponding six-bit physical register number. The integer table requires 33 six-bit entries or 198 bits total. The floating-point table requires 32 six-bit entries or 192 bits total.

Figure 3:
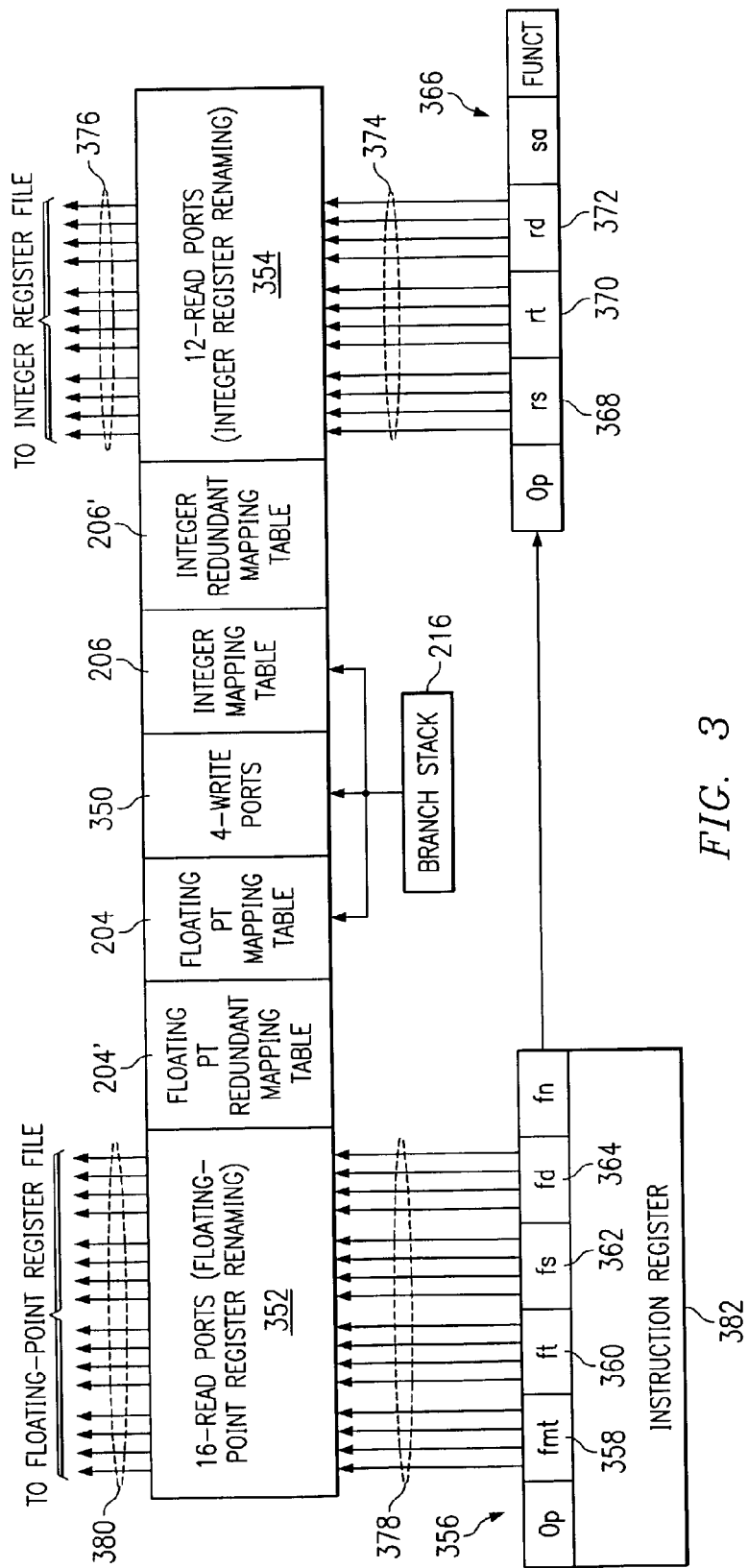
FIG. 3 illustrates a simplified example of a mapping table for the processor.

FIG. 3 shows an example of the mapping table configuration. Four write ports 350 are used to rename physical destination registers of the four instructions being simultaneously decoded for a total of four values being output from integer free list 208 and/or floating-point free list 210. The same ports are used for both mapping tables 204 and 206 because an instruction may have either an integer or a floating result. Write ports 350 are also used by branch stack 216 to "update" mapping tables 204 and/or 206 when these tables are restored from shadow mapping tables 204' and 206'. If a six-bit word is written by any write port during the update operation, it is not restored from a shadow mapping table.

Integer mapping table 206 has twelve read ports 354 which map three logical register numbers (operands 368 and 370 and destination 372) for each integer instruction 366 (up to a maximum of four instructions in parallel). Each line 374 represents a five-bit logical register number (maximum of twelve lines for four instructions) and each line 376 represents a six-bit physical register number.

Floating-point mapping table 204 has sixteen read ports 352 which map four logical register numbers (operands 358, 360, and 362 and destination 364) for each floating-point instruction 356 (up to a maximum of four instructions in parallel). Each line 378 represents a five-bit logical register number (maximum of sixteen lines for four instructions) and each line 380 represents a six-bit physical register number. Instruction register 382 provides a total of four instructions (floating-point and/or integer) to the foregoing read ports during each cycle. Each mapping table includes a number of mapping table cells (primary and redundant) and read and write decoders.

Each mapping table includes a shadow map containing four entries. Whenever a branch instruction is executed tentatively, integer mapping table 206 and floating-point mapping table 204 are copied in parallel into a selected shadow entry. This copy is retained in case the branch was mispredicted. When a mispredicted branch is undone, the original contents of the mapping tables are restored from the corresponding shadow entry. Floating-point shadow mapping table 204' contains four 192-bit entries (6 bits each for 32 registers). Integer shadow mapping table 206' contains four 198-bit entries (6 bits each for 33 registers). Each bit entry may be held by a conventional RAM cell. Although shown as separate units for purposes of discussion, mapping table 204 (206) and shadow mapping table 204' (206') may be embodied in a single mapping table.

Each shadow entry is a copy of a mapping table at the beginning of the decode cycle (stage 2) for the predicted branch instruction. Because processor 100 decodes up to four instructions in parallel, a shadow copy does not correspond exactly to the state of the mapping table after the branch instruction. The table must be updated with changes made for preceding instructions that were decoded during the same cycle. Branch stack 216 retains this information and updates the appropriate mapping table(s) when redundant mapping tables are restored.

The goal in designing dependency logic 200 is to fix the timing paths related to condition code instructions. Examples of condition code instructions processed and affected by the dependency logic include c.cod.fmt which is the instruction that compares floating point values and sets one condition bit, CTC1.$31 which is an instruction that copies a word from a general purpose register to a floating point control register $31 and sets all condition bits, movf and movt which are instructions that test a floating point condition code and conditionally moves a general purpose register value, movf.fmt and movt.fmt which are instructions that test a floating point condition code and conditionally move a floating point value, and BC1F/BC1FL/BC1T/BC1TL which are instructions that test a condition bit and do a conditional branch.

Conventionally, a value bit is assigned in active list 212 for each compare instruction. Thus, the number of physical registers would be the same as the size of active list 212. Assuming the bottleneck is the size of active list 212, there would be 48 physical registers for active list 212 having a size of 48 in a worst case scenario. However, most programs have some optimization such that the worst case scenario is not met. For an implementation of 8 logical condition bits, the maximum number of consecutive compare instructions would be 8. If there happens to be more, then the older compare instructions are ignored. The worst case for non-consecutive compare instructions is that there is also an associated instruction that tests a bit in active list 212. With the number of test instructions being the same as the number of compare instructions, the maximum number of non-consecutive compare instructions would be 20 for an active list size of 48. This would result in 28 free registers and 36 physical condition bit registers. Changing the active list size to 64 would provide a maximum of 44 physical registers in an optimized program. Since the condition code is only one bit, additional physical condition code registers does not significantly impact silicon area.

Dependency logic 200 keeps track of the dependency between the destination register set by a compare instruction and the operand register tested by a branch on condition instruction. After an instruction is decoded and before it graduates, the condition code instruction remains in active list 212. Active list 212 treats a condition code instruction like any other instruction except that some of the fields in active list 212 are reserved for condition code instructions. The condition code instruction includes a one bit compare field which sets a floating point condition code bit, a one bit latest field which indicates that this instruction is the latest one to set its condition code bit, a three bit ccstate field which indicates a value for this condition code bit, and a three bit ccselect field indicating which one of the 8 condition code bits is set by this instruction.

For a floating point compare instruction, each active list entry contains the eight bits identified above for keeping track of the condition code bit set by each compare instruction. The ccselect field is loaded from bits 10:8 of the compare instruction. When a compare instruction is decoded, active list 212 sets the compare field bit and the latest field bit to one. Several compare instructions may be decoded during the same cycle. If they select the same condition code bit, then the latest field bit is set only for the latest instruction. The latest field bit of any previous instruction matching the same condition code bit are reset. The value bits of the ccstate field are reset to zero. The latest field bit is copied into the branch stack whenever a speculative branch is decoded. If that branch is reversed, then the latest field bit is restored from the branch stack. The bit written into the branch stack is not reset by any compare following the branch.

For conditional branch or conditional move instructions, the condition code bit to be tested is selected from instruction bits 20:18 which are compared to the ccselect field bits of each entry in active list 212. If a hit signal is not asserted, the tested condition code bit has not been set by any active instruction and its value is valid. If the hit signal is asserted and a valid signal is not, the tested condition bit has been set by an active instruction that has not completed execution. If both the hit and valid signals are asserted, the tested condition code bit has been set by an active signal that has completed execution. The value of the tested condition code bit is stored in active list 212 and is available for use.

Figure 4A:
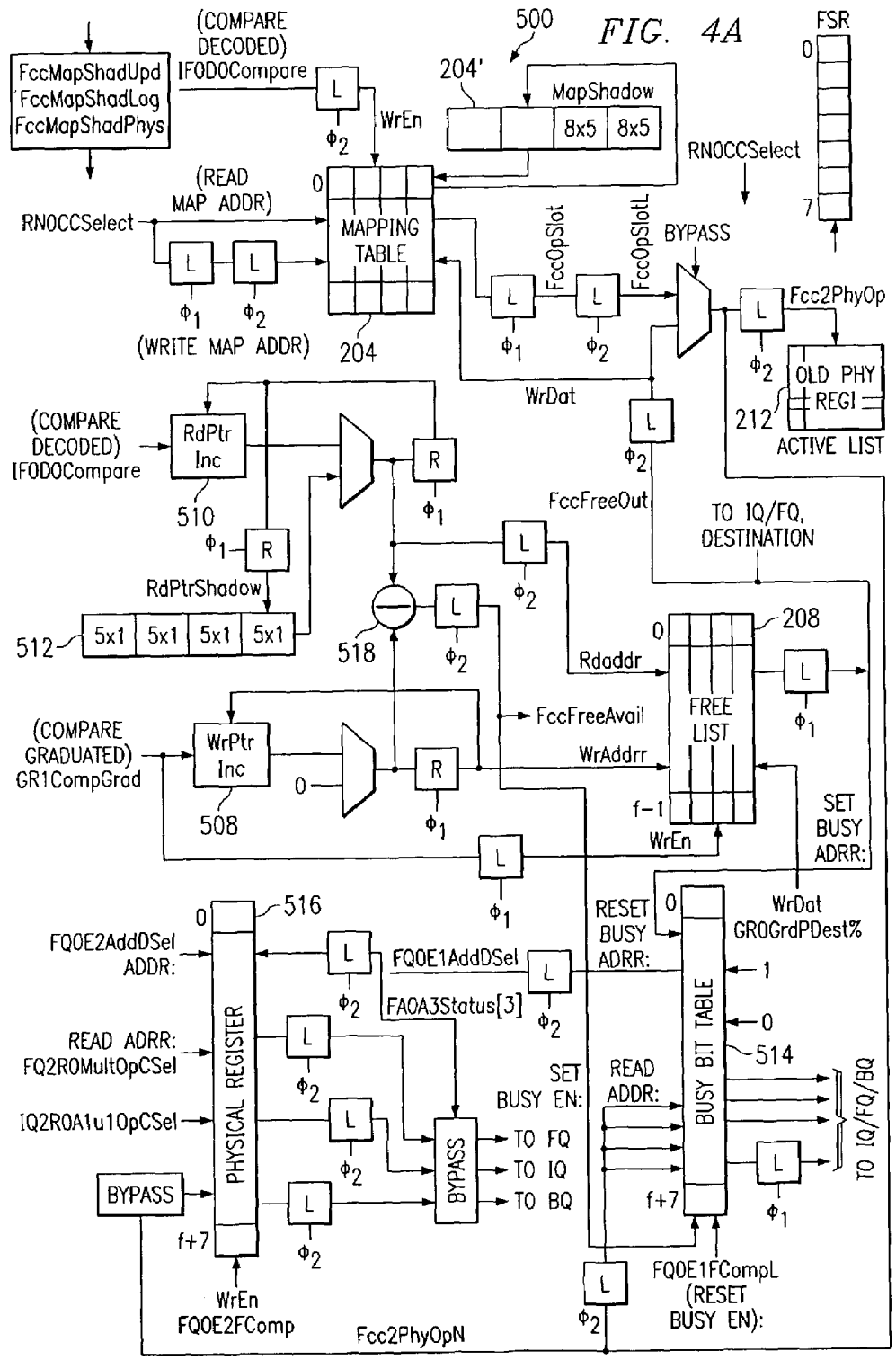
FIGS. 4A-B illustrate a simplified depiction of a redesign of dependency logic within the processor.
Figure 4B:
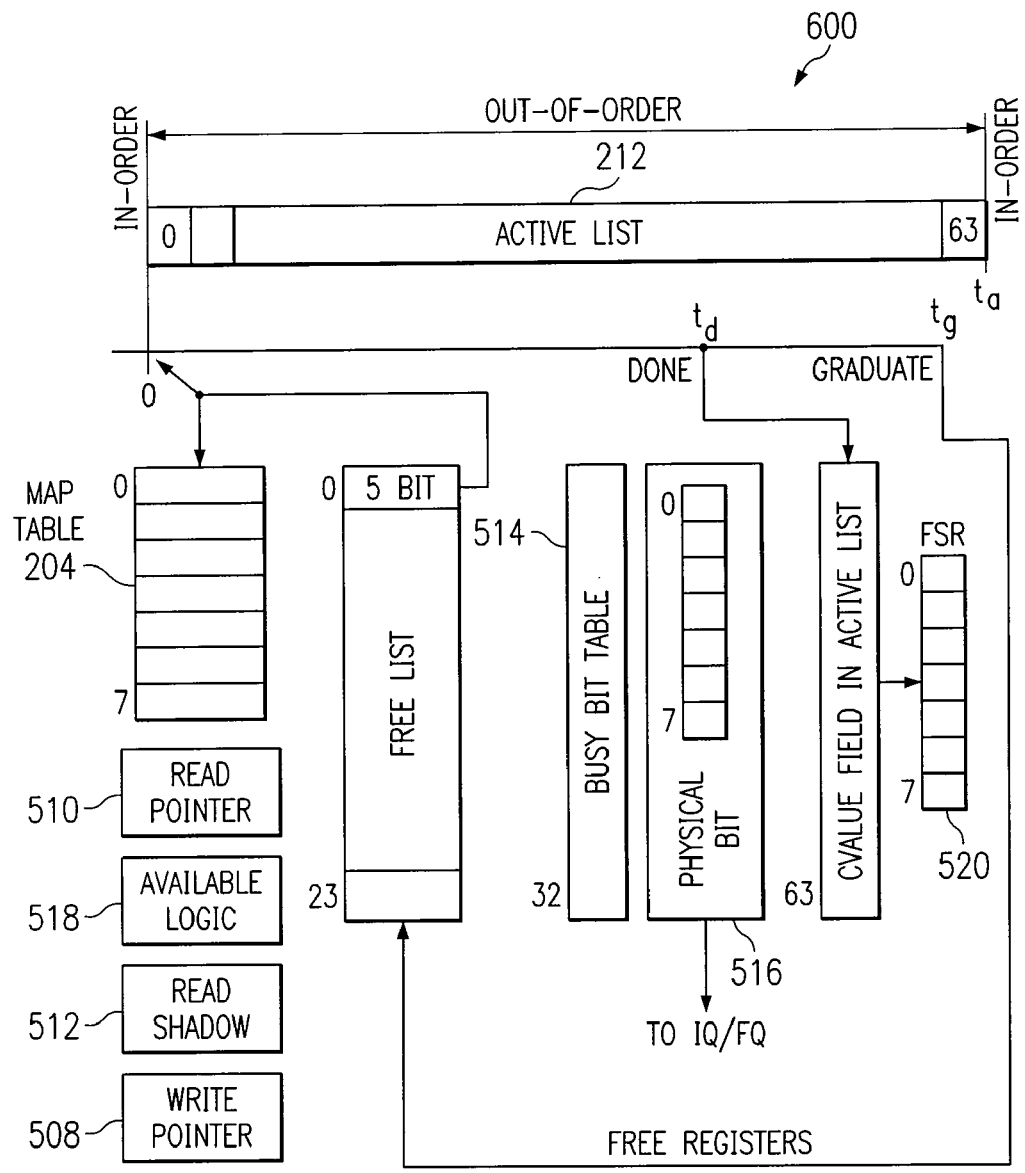

FIGS. 4A-B show a redesign 500 of dependency logic 200 with respect to floating point instructions according to an embodiment of the present invention. Redesign 500 includes mapping table 204, a shadow mapping table 204', free list 208, a write pointer 508, a read pointer 510, a shadow read pointer 512, a busy bit table 514, a condition code physical register 516, available logic 518, and a floating point status register 520. Redesign 500 is discussed with respect to compare, move, and conditional branch instructions.

For floating point compare instructions, IF0D0Compare=1 with the bit specified by RN0CCSelect upon instruction decoding. The logical condition code selected, RN0CCSelect, and the old physical register bit number from free list 208 are written to active list 212. The old physical register bit number is the register that mapped the same bit number before the current compare instruction. When the compare instruction graduates, the physical register bit number will return to free list 208. Mapping table 204 writes the register number FccFreeOut provided by free list 208 as the new physical destination to the address specified by RN0CCSelect. Read pointer 510 of free list 208 is incremented to indicate that the number of free registers is reduced by one. If there are no more available free registers, signal FccFreeAvail=0 and instruction decoding is stopped until a free register becomes available in free list 208. Busy bit table 514 sets a busy bit at address FccFreeOut. This busy bit indicates that the compare instruction is sent to the queues. The busy bit will remain set until the compare instruction has been completed. The result associated with the compare instruction is available at condition code physical register 516. The compare instruction is identified by the physical number FQ0E2AddDSel and the status signal FQ0E2FComp. When FQ0E2FComp=1, the physical bit register writes the value of the compare instruction result FA0A3Status[3] to the address FQ0E2AddDSel. Busy bit table 514 is then reset to indicate that the compare instruction has finished and the result is known. When the compare instruction graduates, write pointer 508 is incremented to release one available register, the old physical register, to free list 208.

For conditional branch instructions, the entire contents of mapping table 204 are copied to shadow mapping table 204'. The precise state of the mapping table is stored in shadow mapping table 204' at the point when the conditional branch instruction is decoded, including the physical and logical register numbers at the point when the conditional branch instruction is decoded. Read pointer 510 is stored into shadow read pointer 512. Mapping table 204 outputs the physical register number FccOpSlot associated with RN0CCSelect. FccOpSlot goes through bypass logic to generate Fcc2PhyOpN. This ensures that if a condition bit was set by a previous compare during the same decode cycle, then it will bypass the compare instruction's destination number from free list 208 instead of reading it from mapping table 204. Fcc2PhyOpN is then passed on as GR2CCTag. Redesign 500 provides the condition code value, if known. If busy bit table 514 at address Fcc2PhyOpN is not busy, then the condition code is already set. If it is busy, but the compare result FQ0E2FComp is just finished, then the condition bit value is bypassed from the floating point adder. If the condition code value is not yet known, the floating point compare destination address FQ0E1AddDSel will be polled until the compare instruction is done.

When a conditional move instruction is decoded, redesign 500 is responsible for passing the physical operand register number and the busy bit. Mapping table 204 reads out the physical register number FccOpSlot associated with RN0CCSelect. FccOpSlot goes through bypass logic to generate Fcc2PhyOpN. This ensures that if a condition bit was set by a previous compare instruction during the same decode cycle, then it will bypass the compare instruction's destination number from free list 208 instead of reading it from mapping table 204. Busy bit table 514 is read and the condition code busy bit status is provided. The busy bit is read out at address Fcc2Phyop. Condition code physical bit register 516 is read where two read ports provide the physical bit at address FQ2R0MultOpCSel for floating point register condition code move instructions and at address IQ2R0AlulOpCSel for integer condition code move instructions. The condition bit value from the floating point adder is bypassed depending on FQ0E2FComp.

Figure 5A:
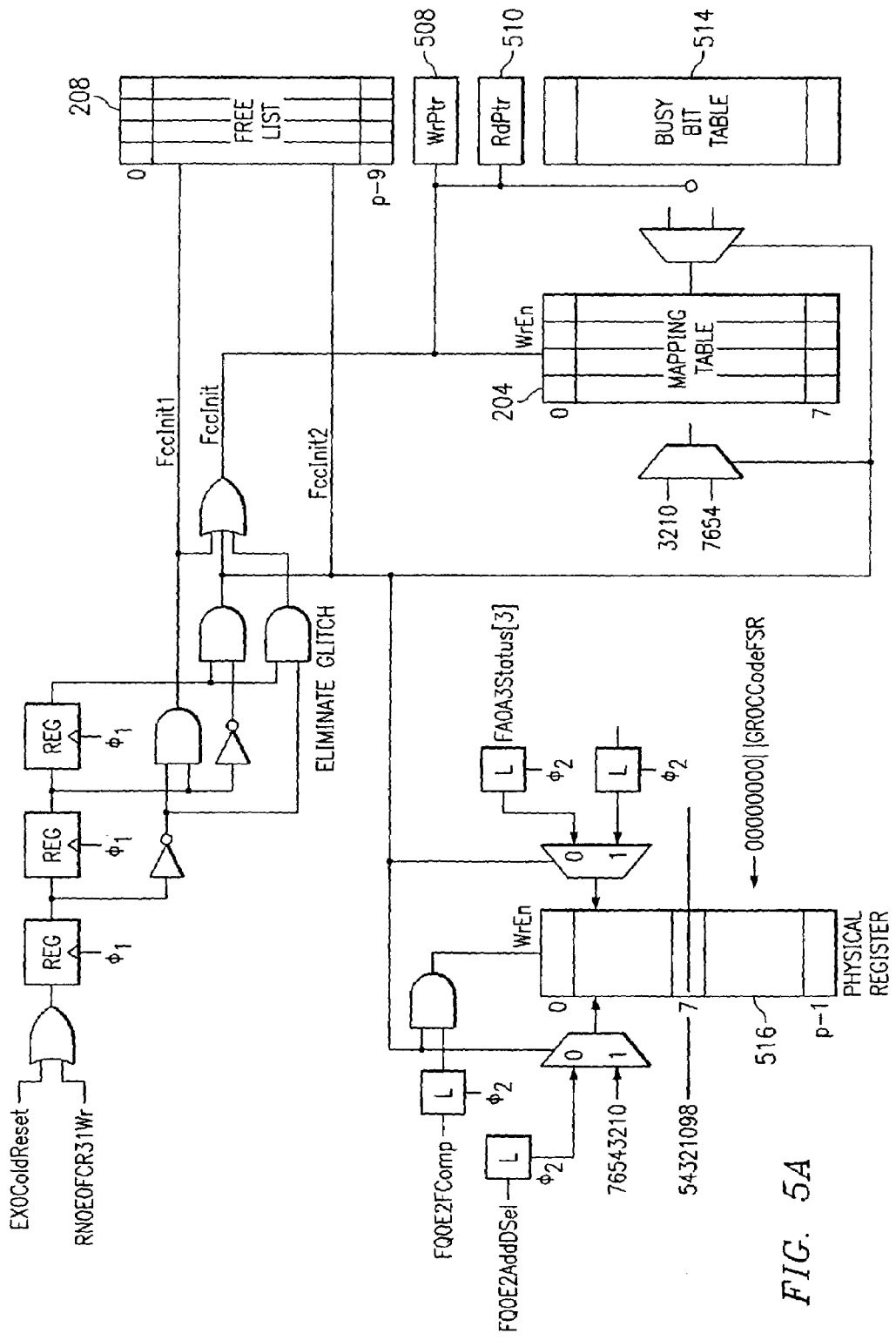
FIGS. 5A-B illustrate further portions of the redesign.
Figure 5B:
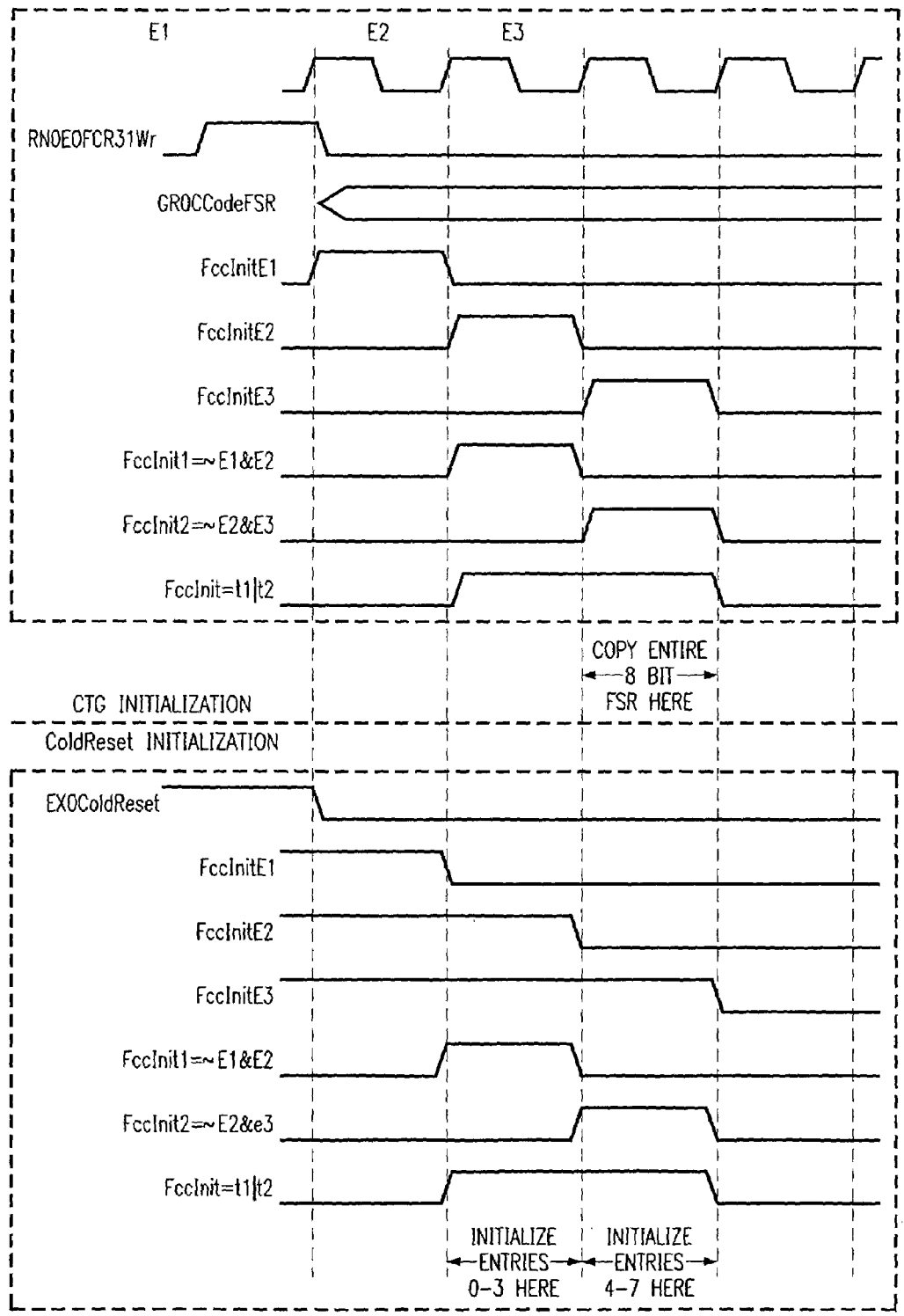

FIGS. 5A-B show redesign 500 of dependency logic 200 and its associated timing diagram for CTCl.$31 instructions and ColdReset instructions. A CTCl.$31 instruction moves a value from an integer register to floating point register $31. As a result, all 8 condition code bits are updated. A CTCl.$31 instruction will not be decoded until all previous instructions have graduated. All instructions following a CTCl.$31 instruction are delayed until the CTCl.$31 instruction has been completed. Once the data is ready to be written, one cycle after RN0E0FCR31Wr=1, the physical condition bit is updated. At the same time, mapping table 204, free list 208, read pointer 510, write pointer 508, and busy bit table 514 are initialized. Writing to floating point register $31 causes the appropriate exception if any cause bit and its corresponding bit are both set. However, floating point register $31 will be written before the exception occurs.

Both CTCl.$31 and ColdReset instructions initialize mapping table 204, free list 208, read pointer 510, write pointer 508, busy bit table 514, and condition code physical register 516. To reduce the number of write ports to memory registers, initialization is performed in two cycles. At the cold start stage, the ColdReset instruction stays high for a long time and then goes low. The falling edge of the signal is used to start initialization. The two cycle write enable signals are FccInit1, FccInit2, and FccInit. Initialization for a CTCl.$31 instruction is triggered when RN0E0FCR31Wr is high for one cycle.

Figure 6A:
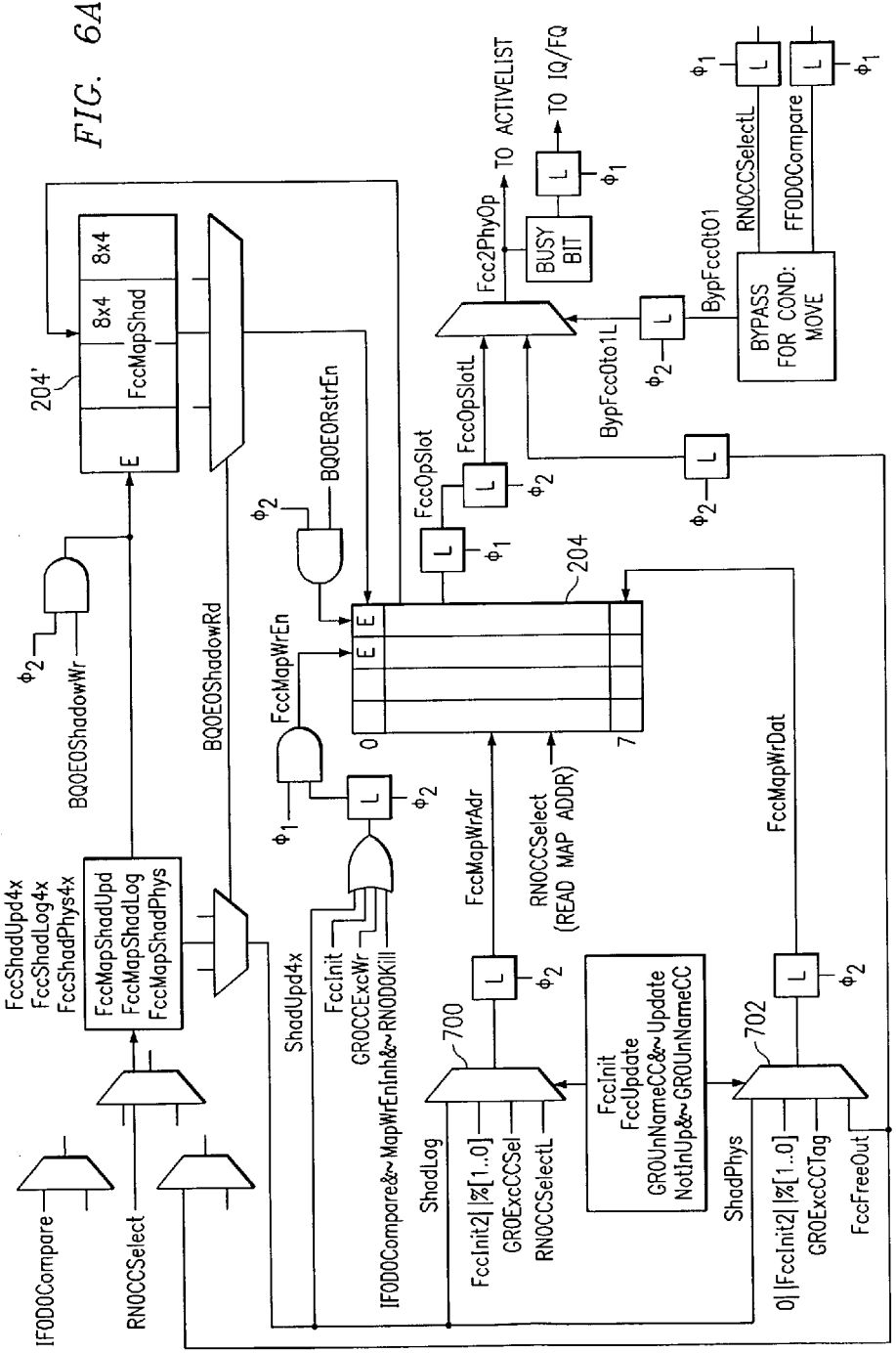
FIGS. 6A-C illustrate a mapping table, timing diagram, and inhibit logic for the redesign.
Figure 6B:
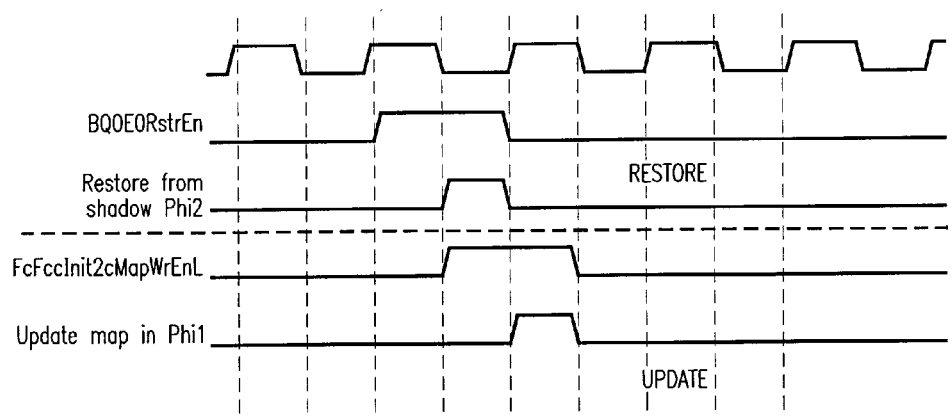
Figure 6C:
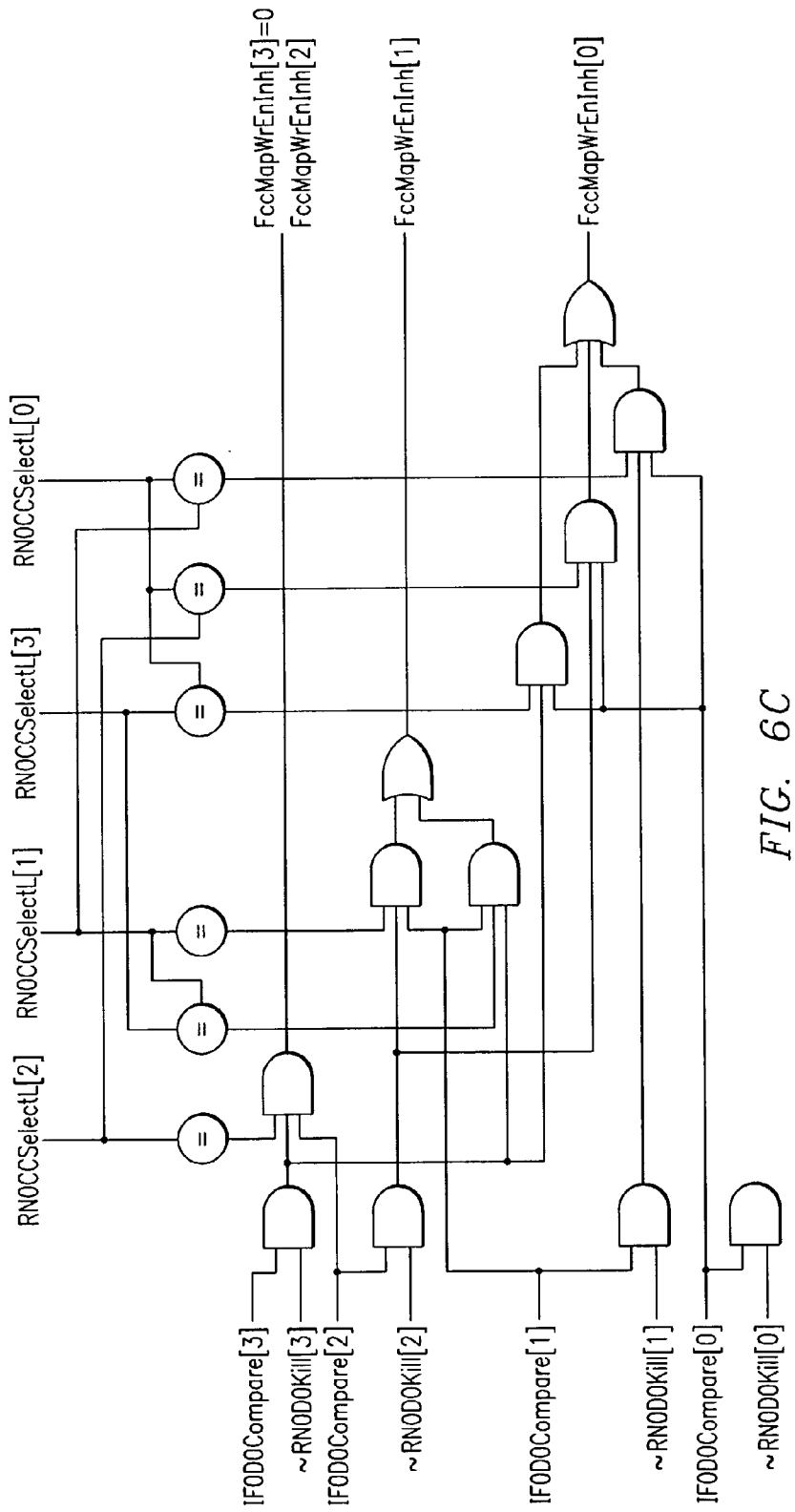

FIGS. 6A-C show mapping table 204, its timing diagram, and inhibit logic of redesign 500 in more detail. To alter the contents of mapping table 204, two multiplexers 700 and 702 are used for the memory addresses and data. In addition, there is an extra write port BQ0E0RstrEn to restore the entire contents of mapping table 204. A branch reversal is performed in two steps. First, a restore step is performed to copy the entire contents of mapping table 204 from this extra write port. Second, an update step is performed to adjust the definite branch point by writing through multplexers 700 and 702. Starting with the highest priority, the priority of the data writing to mapping table 204 through multiplexers 700 and 702 includes initialization selected by FccInit, branch restore selected by BQ0E0RstrEn, exception selected by GR0CCExcWr, and compare selected by IF0D0Compare.

Mapping table 204 has four write ports that correspond to four instructions decoded during each cycle. When a compare instruction enables the writing of mapping table 204, some ports may be inhibited based on the dependencies among the four instructions. For example, port 3 is not inhibited and the write is enabled if port 3 has a valid compare instruction. Port 2 is inhibited if both port 2 and port 3 have valid compare instructions with the same destination. Port 1 is inhibited if either port 1 and port 2 or port 1 and port 3 have valid compare instructions with the same destination. Port 0 is inhibited if port 0 and port 1, port 0 and port 2, or port 0 and port 3 have valid compare instructions with the same destination.

Figure 7:
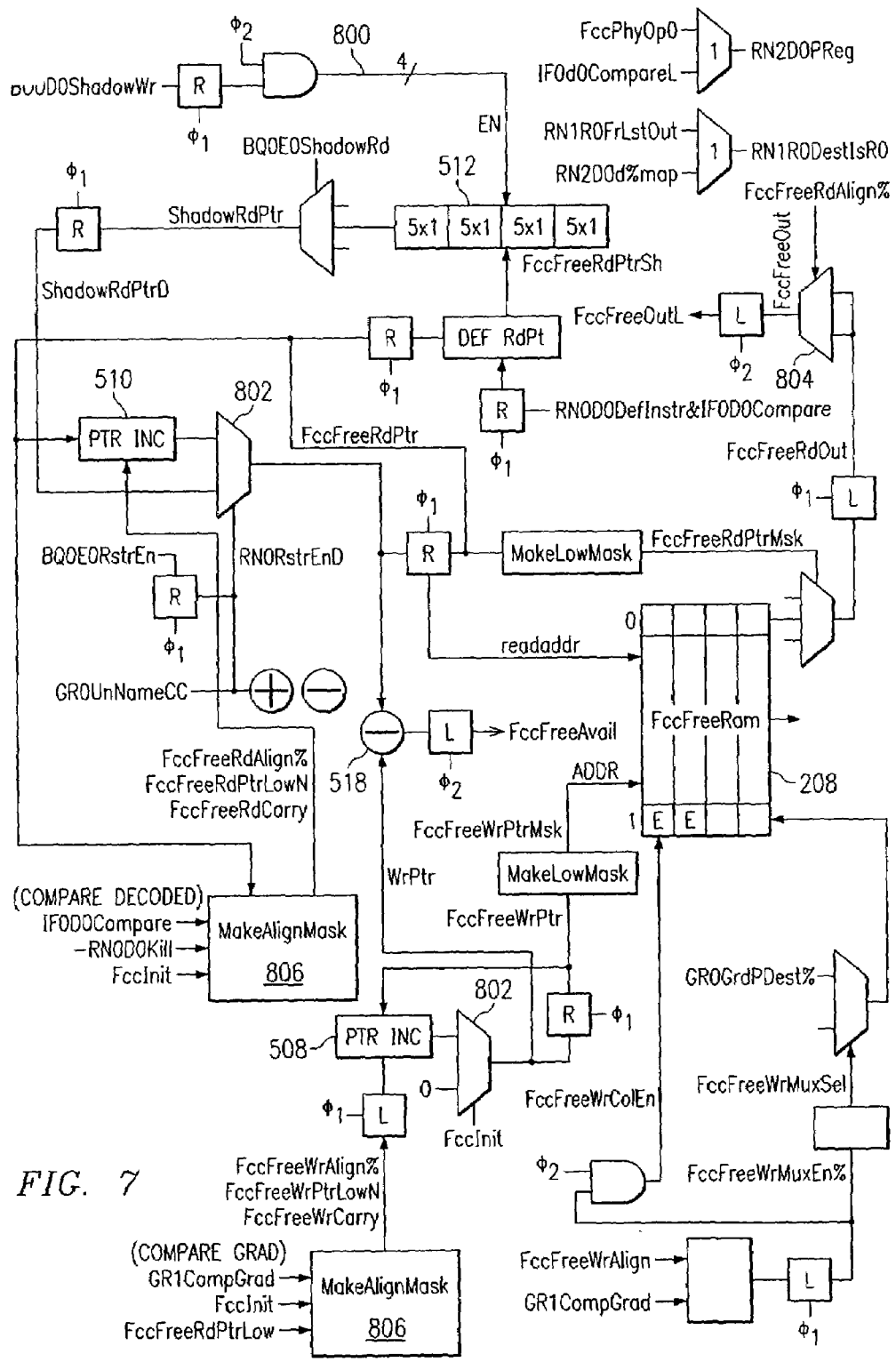
FIG. 7 illustrates a free list configuration of the redesign.

FIG. 7 shows free list 208 of redesign 500 in more detail. Redesign 500 includes free list 208, a decoder 800, input multiplexers 802, output multplexers 804, read pointer 510, shadow read pointer 512, write pointer 508, alignment multiplexers 806, and availability logic 518. When a compare instruction is decoded, free list 208 provides the compare instruction with a free register number and read pointer 510 is incremented. Mapping table 204 sends the old register number to active list 212 and writes the new free register number to its entry. If a second compare instruction is decoded, mapping table 204 repeats this procedure by obtaining a second new register number from free list 208 and carry the old register number that was assigned to the first compare. When the second compare instruction graduates, it returns the old register number, which is the first free register number, to free list 208. Free list 208 writes this number and increments write pointer 508.

Consider for example the instruction stream {m1, m0, c0, m0, c2, c0, c1, c0} where m represents a move instruction, c represents an instruction setting a condition bit, and the integer represents the particular condition bit involved. This instruction sequence is received and processed in the order shown. However, to distinguish between the first c0 instruction and the third c0 instruction, the instruction or register which it has as the destination needs to be renamed as a new sequence of unique numbers. Processor 100 uses these new numbers to identify the register dependencies. In generating these new numbers, they should be unique and they should be finite as a result of hardware limitations. The way the numbers are generated and the way the numbers are reused determines the efficiency of the dependency hardware.

Figure 8:
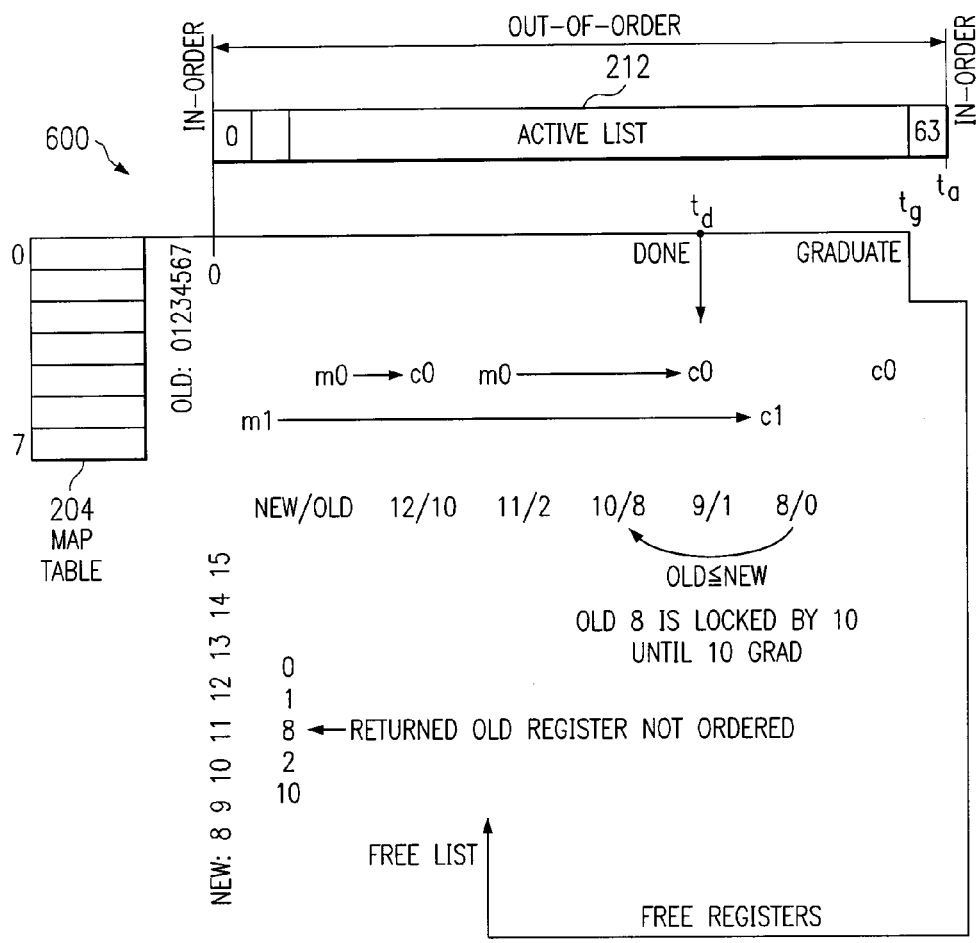
FIG. 8 illustrates an example of renaming registers within the processor.

FIG. 8 shows an example of the renaming process. Initially, mapping table 204 contains the old register numbers where entry 0 has value 0, entry 1 has value 1, and so on up to entry 7 having value 7. Free list 208 provides a unique number from the series 8, 9, 10, 11, 12, . . ., and so on. When the first instruction c0 is decoded, it replaces old register number 0 with new register number 8 in mapping table entry 0. This instruction then carries the old register number 0 to travel through active list 212. When this instruction graduates, active list 212 returns old register number 0 to free list 208. When the next instruction c1 is decoded, it replaces old register number 1 at entry 1 of mapping table 204 with new register 9 from free list 208. When instruction c1 graduates, old register 1 is returned to free list 208. When the next instruction c0 is decoded, new register 10 from free list 208 replaces old register 8 in mapping table 204. When the second c0 instruction graduates, register number 8 is returned to free list 208. New register numbers are generated in a sequential order as 8, 9, 10, 11, 12, . . . but old register numbers are returned in a random order as 0, 1, 8, 2, 10, . . . which increases complexity once the random sequence reaches the top of free list 208.

In order to avoid using registers in a random order, it is desirable to return new register numbers in order instead of returning old register numbers in a random order. The complication occurs as a result of new registers expiring once the associated instruction graduates. In order to retire the new registers, the result will be saved in the floating point status register before the instruction graduates, inform mapping table 204 that the result is in the floating point status register so that a move instruction can retrieve it, and let the queues know that the result is in the physical register while the instruction is still valid or that the result is in the floating point status register after the instruction graduates.

Figure 9:
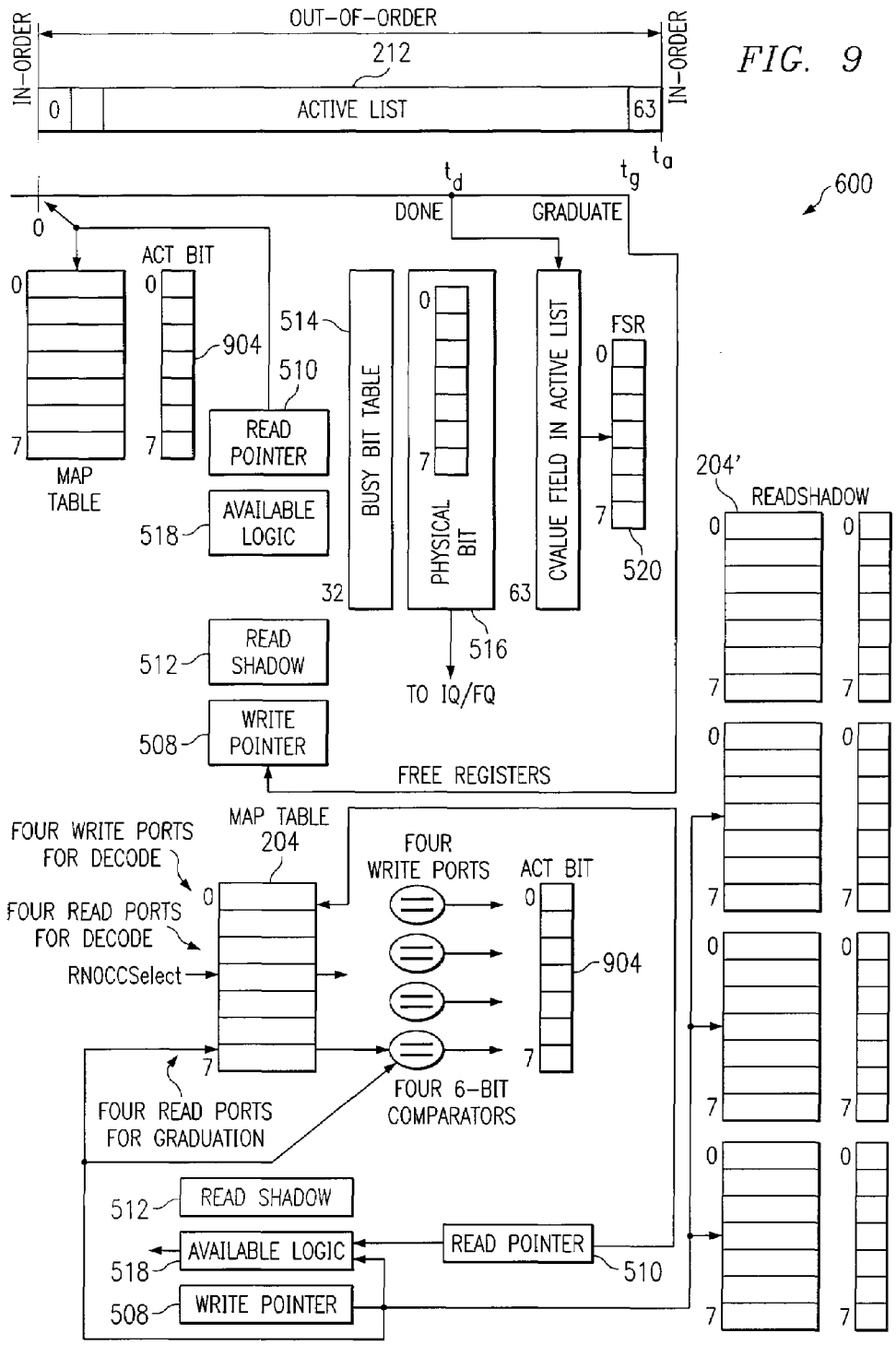
FIG. 9 illustrates an alternate redesign of the dependency logic for the processor.

FIG. 9 shows an example redesign 600 of returning new register numbers instead of old register numbers. The result can be stored in the floating point status register 520 by writing the ccstate field in active list 212 to the floating point status register. Instead of using free list 208 to return and recycle new register numbers in sequential order as can be used in redesign 500, redesign 600 uses a single bit status register Act Bit 904 in order to enhance usage of mapping table 204. Each entry of mapping table 204 has a corresponding Act Bit. This bit becomes set when a compare instruction is decoded and is reset by the same instruction whose tag is still in mapping table 204. The Act Bit may not be reset if the tag in mapping table 204 is not the same as the new register numbers whose instructions are graduating. In this manner, the Act Bit always reflects the status of the tag in mapping table 204. If Act Bit=0, then the result is in the floating point status register. If the Act Bit=1, then the register number in mapping table 204 is valid and the result is in the condition code physical register if the busy bit is reset. Since the condition code is only one bit, the value of the condition code may be copied to the queues once the instruction executes. For designs having a condition code physical register not being a single bit, the queues would be modified to switch the result from the condition code physical register to the logical registers.

The single status Act Bit presents the status of the instructions in active list 212. When a conditional branch instruction is decoded, mapping table 204 and Act Bits are copied to shadow mapping table 204'. When a branch is reversed, the status at the reversal point for the instruction before the branch needs to be restored. All that needs to be restored is the single compare instruction immediately before the conditional branch instruction. Thus, shadow mapping table 204' only needs sufficient memory space for mapping table 204 and single bit status register 904 to reverse the branch. To handle four conditional branch instructions, four shadow mapping tables 204' may be used. Each shadow mapping table 204' may have a structure similar to mapping table 204 with four read ports and four comparators with each shadow mapping table 204'. The entire contents of mapping table 204 and single bit status register 1001 are copied to shadow mapping table 204' in one cycle when the conditional branch instruction is decoded. The single bit status register 904 is updated, also within shadow mapping table 204', each cycle depending on whether there are any compare instructions graduating before the conditional branch instruction graduates. Thus, the single bit status register 904 with mapping table 204 maps instructions, maintains status of compare instructions, and performs all dependency bookkeeping. Free list 208 can be eliminated and read pointer 510 is maintained to generate in order register numbers in response to recycling by write pointer 508.

Figure 10A:
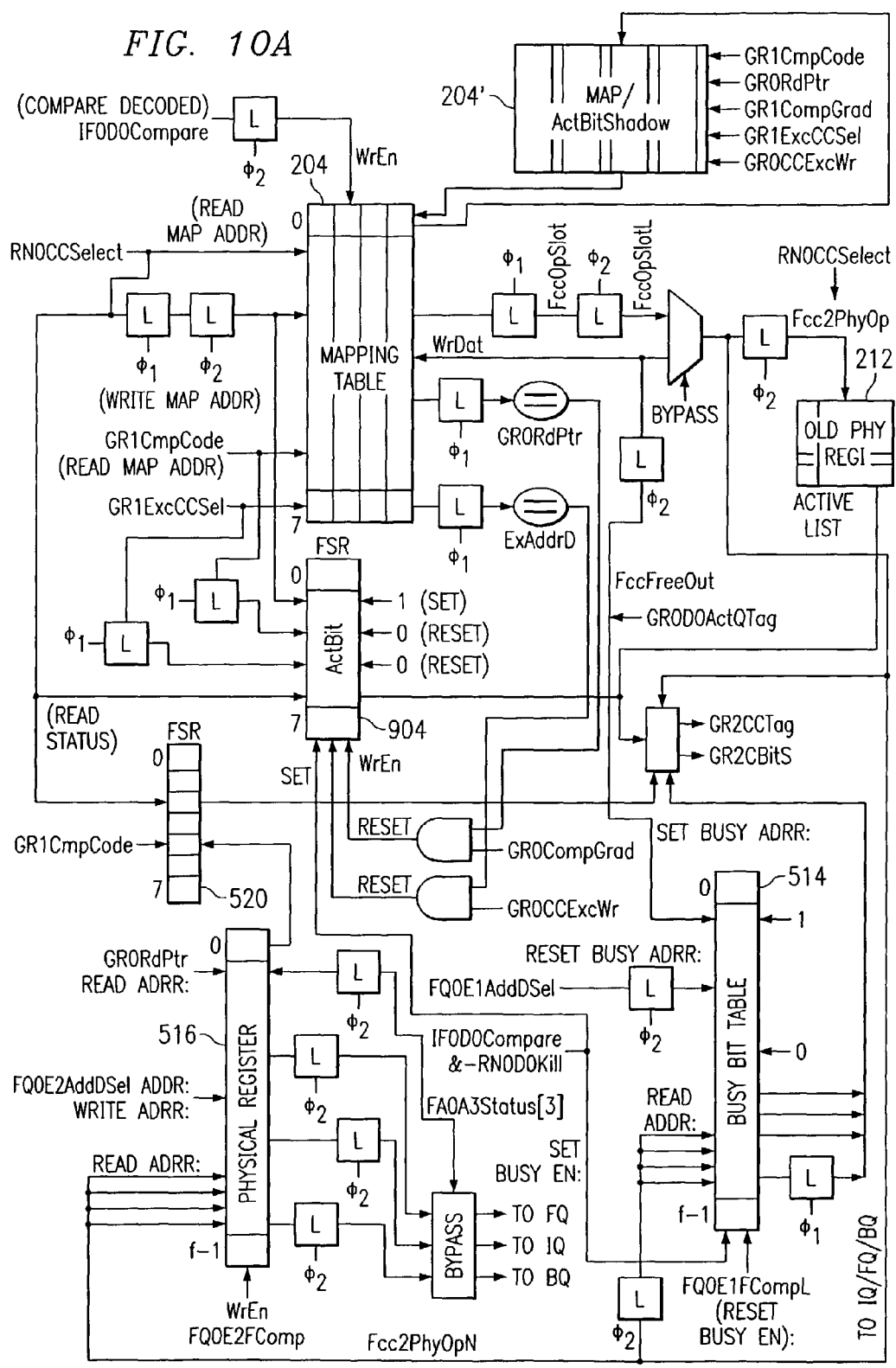
FIG. 10 illustrates yet another redesign of the dependency logic for the processor.
Figure 10B:
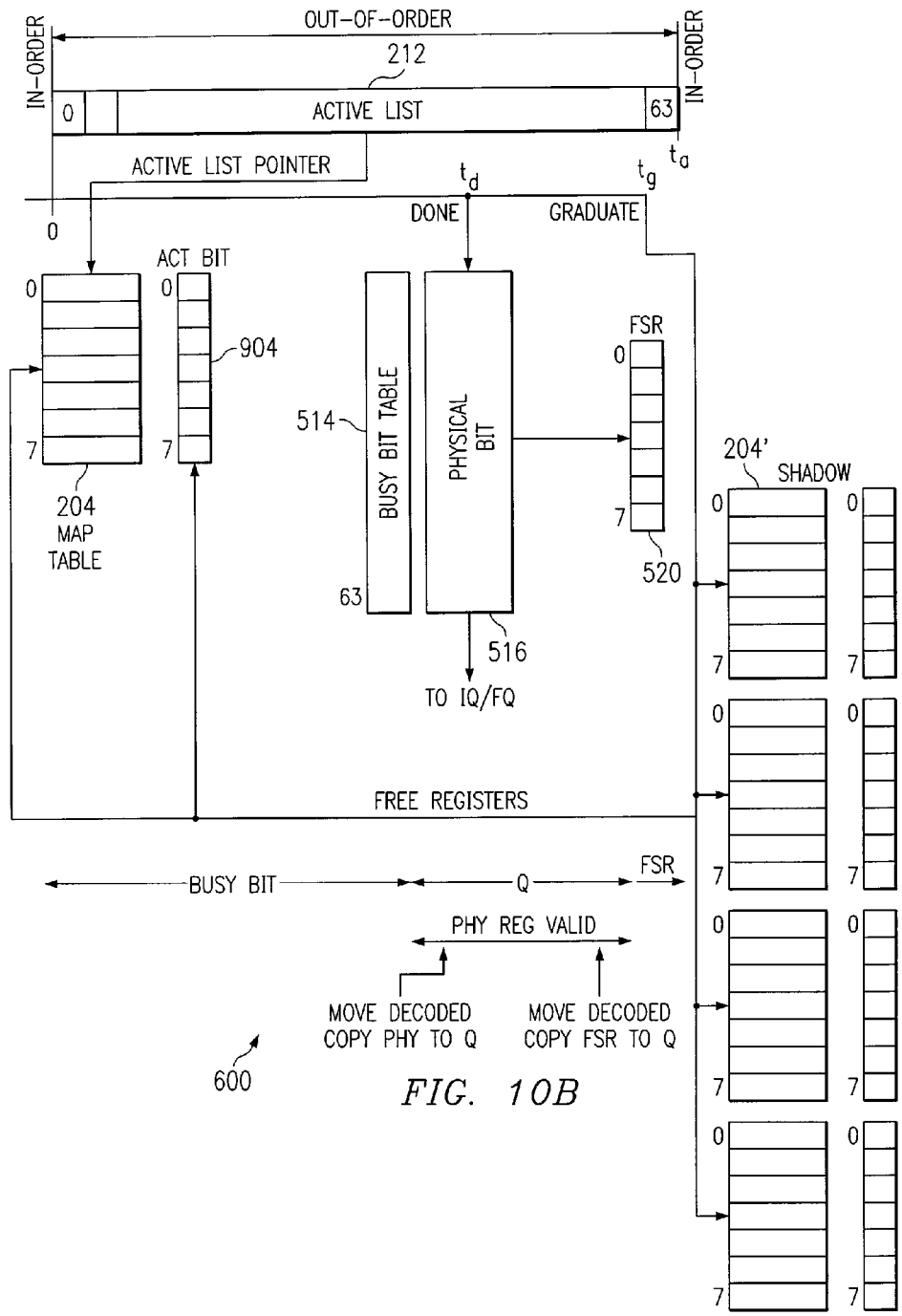

FIGS. 10A-B show an example of an additional redesign 700 to dependency logic 200. In eliminating free list 208, the circuit design may be further reduced since decoder 800, input multiplexers 802, output multiplexers 804, and alignment multiplexers 806 may also be removed. All that is added is single status bit register 904 and four extra ports for each mapping table. More savings to the design may also be made. Write pointer 508 collects the free registers to be reused. When register numbers come back in order, write pointer 508 merely provides the number of free registers. With a sufficient number of condition code physical registers 516, there is no longer a need for write pointer 508. The maximum number of condition code physical registers 516 is limited by the size of active list 212. Since there is no longer a worry that the condition code physical registers 516 will run out, availability logic 518 may also be removed. Read pointer 510 generates a set of unique numbers and it does not matter what those unique numbers are. With the number of condition code physical registers being the same as the size of active list 212, a write pointer for active list 212 can be used in place of read pointer 510. Since the write pointer for active list 212 has its own shadow logic, read pointer 510 and shadow read pointer 512 may be eliminated. Furthermore, with the write pointer of active list 212 being used as a read pointer for mapping table 204, the ccstatus field can be removed from active list 212. This removal occurs as a result of the values in floating point status register 904 being copied from condition code physical registers 516. Condition code physical registers 516 use four extra read ports to read the values but have smaller decoder logic than that of redesign 500.

Figure 11A:
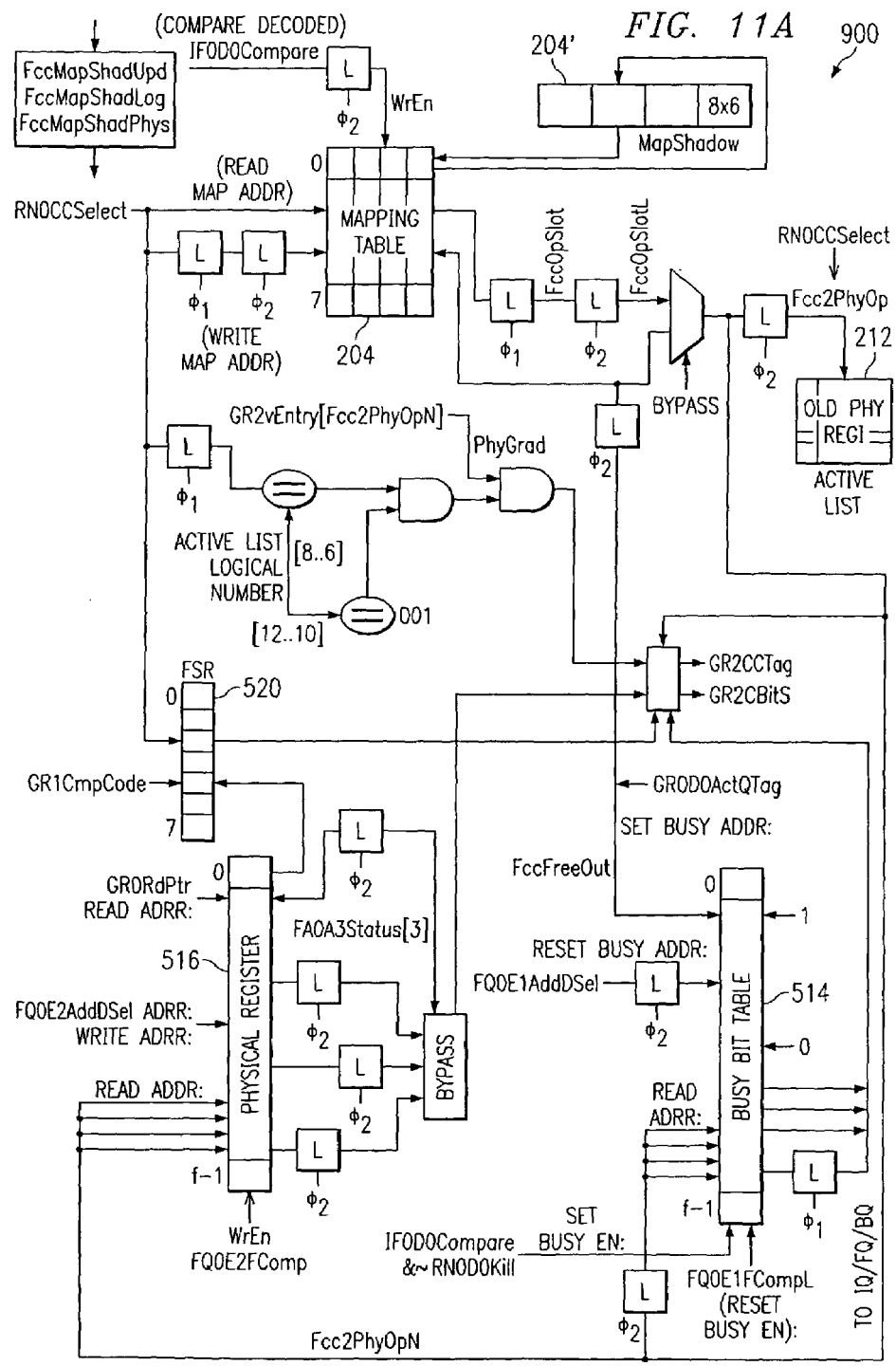
FIGS. 11A-B illustrate a further redesign of the dependency logic for the processor.
Figure 11B:
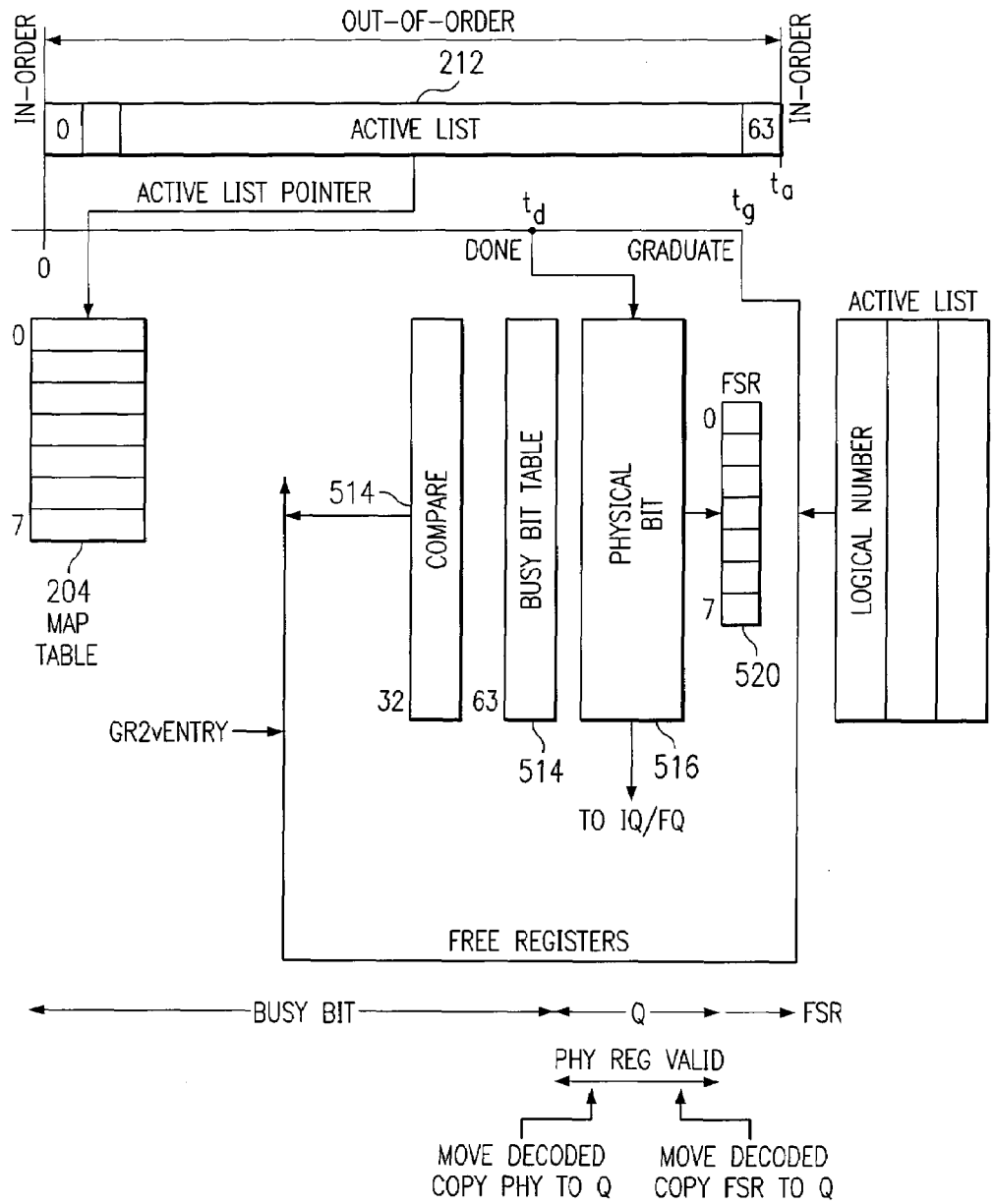

FIGS. 11A-B show an additional redesign 900 to dependency logic 200. Single status bit register 904 keeps track of the status of the register tag stored in mapping table 204. For a physical register, the Act Bit updates the stage of the instruction that sets the register whether or not the instruction is still active. For a particular register i, if Act Bit(i)=1, then the physical register Map(i) is still in active list 212. For a logical register, the entry location of the register tag implies which current physical register it is mapped to. Since the Act Bit keeps track of the status of the physical register, it also does the bookkeeping for the logical register as well. Thus, if Act Bit(i)=1, then logical register i is still in active list 212. If Act Bit (i)=0, then the tag Map(i) is invalid. Active list 212 generates a mask GR2vEntry[0 . . . 48] to indicate which instructions are valid in active list 212. To check whether physical register Map(i) is in active list 212, just read out the value of GR2vEntry[Map(i)]. If it equals 1, it means that instruction Map(i) at the entry is still active. Active list 212 has a field ActReg that stores the logical register number for each instruction. To check which logical register number is set, just read out the value of ActReg{Map(i)}. If it is equal to 1, it may indicate that a previous compare instruction is still active. Thus, the evaluation of ActReg{Map(i)} does the bookkeeping for the logical register the same way a three bit code can be read from active list 212 to determine if it is also a compare instruction. Thus, single bit status register 904 may be removed in favor of these signals.

The design improvements to processor 100 discussed above provide numerous advantages over previous microprocessor designs. These advantages include having a smaller silicon area to lower cost, use of a regular layout structure to save implementation time, guarantees to always have an available register for better performance, improved timing by not slowing the critical path, the size of the bookkeeping function is not dependent on the number of registers for future expansion capabilities, the physical register file and the logical register file are indexed separately for smaller decoder requirements and faster operation, and the need to only initialize the single status bit register 904 instead of mapping table 204. Moreover, in one embodiment the single bit status register may be eliminated as well as other functional elements used in previous microprocessor designs. In this manner, an efficient microprocessor design can be achieved.

Thus, it is apparent that there has been provided, in accordance with the present invention, a method and system for renaming registers in a microprocessor that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. Moreover, the present invention is not intended to be limited in any way by any statement in the specification that is not otherwise reflected in the appended claims.

What is claimed is:

1. A method for renaming registers in a microprocessor, comprising:
   receiving an instruction for execution;
   decoding the instruction;
   placing the instruction in an active list;
   mapping a logical register associated with the instruction to a selected unique physical register;
   executing the instruction to obtain a result;
   placing the result in the selected unique physical register;
   moving the result to a floating point status register prior to graduation of the instruction;
   returning an identity of the selected unique physical register after moving the result to the floating point status register for future selection upon graduation of the instruction in order to maintain a fixed order for selection of unique physical registers;
   providing an indication in the mapping that the result is in the selected unique physical register while the instruction is still valid or in the floating point status register after the instruction graduates.

2. The method of claim 1, further comprising:
   retrieving the result from the floating point status register in response to an exception.

3. The method of claim 1, further comprising:
   receiving a next instruction for execution;
   decoding the next instruction;
   mapping a logical register associated with the next instruction to a next unique physical register in consecutive succession with the selected unique physical register;
   executing the next instruction to obtain a next result;
   placing the next result in the next unique physical register;
   moving the next result to the floating point status register prior to graduation of the next instruction;
   returning an identity of the next unique physical register for future selection upon graduation of the next instruction.

4. The method of claim 1, further comprising:
   providing an indication that the selected unique physical register is not available for use.

5. The method of claim 3, further comprising:
   providing an indication that the next result is in the next unique physical register while the next instruction is still valid or in the floating point status register after the instruction graduates.

6. The method of claim 5, wherein the indication is maintained in a single bit status register.

7. The method of claim 1, further comprising:
   storing the mapping of the logical register to the selected unique physical register and the indication as to where the result is stored in response to the instruction being a conditional branch instruction.

8. The method of claim 1, further comprising:
   obtaining an identity of the selected unique physical register from a list of available unique physical register identities.

9. The method of claim 1, further comprising:
   placing condition codes associated with the instruction in the active list;
   using a pointer corresponding to the active list to identify the mapping of the logical register to the selected unique physical register.

10. The method of claim 1, wherein mapping of the logical register to the selected unique physical register is performed without any prior mapping initialization.

11. A system for renaming registers, comprising:
    a plurality of unique physical registers;
    a mapping table operable to map a logical register associated with an instruction to a selected one of the plurality of unique physical registers, the selected unique physical cal register operable to receive a result in response to execution of the instruction;
    an active list operable to maintain condition codes associated with the instruction;
    a floating point status register operable to receive the result from the selected unique physical register prior to graduation of the instruction;
    wherein the mapping table includes an indication that the result is in the floating point status register after the instruction graduates or in the selected unique physical register while the instruction is still valid, the mapping table operable to return an identity of the selected one of the plurality of unique physical registers after moving the result to the floating point status register for future selection upon graduation of the instruction in order to maintain a fixed order for selection of unique physical registers.

12. The system of claim 11, wherein the mapping table and the active list are accessed through a same write pointer.

13. The system of claim 11, wherein the selected unique physical register is returned for future reuse.

14. The system of claim 13, wherein the plurality of unique physical registers are selected and returned in a consecutive order.

15. The system of claim 11, further comprising:
a shadow mapping table operable to receive the mapping of the logical register to the selected unique physical register and an indication as to whether the result is in the floating point status register or the selected unique physical register.

16. A system for renaming registers, comprising:
means for receiving an instruction for execution;
means for decoding the instruction;
means for placing the instruction in an active list;
means for mapping a logical register associated with the instruction to a selected unique physical register;
means for executing the instruction to obtain a result;
means for placing the result in the selected unique physical register;
means for moving the result to a floating point status register prior to graduation of the instruction;
means for returning an identity of the selected unique physical register after moving the result to the floating point status register for future selection upon graduation of the instruction in order to maintain a fixed order for selection of unique physical registers;
means for providing an indication in the mapping that the result is in the selected unique physical register while the instruction is still valid or in the floating point status register after the instruction graduates.

17. The system of claim 16, further comprising:
means for storing the mapping of the logical register to the selected unique physical register and the indication as to where the result is stored in response to the instruction being a conditional branch instruction.

18. The system of claim 16, further comprising:
means for providing an indication that the result is either in the selected unique physical register or in the floating point status register.

19. The system of claim 18, wherein the indication is maintained in a single bit status register.

20. The system of claim 16, further comprising:
means for placing condition codes associated with the instruction in the active list;
means for using a pointer corresponding to the active list to identify the mapping of the logical register to the selected unique physical register.

\* \* \* \* \*